United States Patent [19]

Clemens

[11] Patent Number: 4,920,900
[45] Date of Patent: May 1, 1990

[54] PLANTING DEVICE ATTACHABLE TO AN AGRICULTURAL VEHICLE

[76] Inventor: Bernard Clemens, Königsberger Strasse 8, D-5560, Wittlich, Fed. Rep. of Germany

[21] Appl. No.: 326,341

[22] Filed: Mar. 21, 1989

[30] Foreign Application Priority Data

Mar. 24, 1988 [DE] Fed. Rep. of Germany ....... 3809897

[51] Int. Cl.$^5$ .......................... A01C 5/04; A01C 11/02
[52] U.S. Cl. ...................................... 111/115; 111/89; 111/102
[58] Field of Search ............... 172/21, 22; 111/101.89, 111/102, 105, 109, 110, 115, 117, 116, 118, 128

[56] References Cited

U.S. PATENT DOCUMENTS

| | | | |
|---|---|---|---|
| 252,403 | 1/1882 | Tennent | 111/115 |
| 2,779,111 | 1/1957 | Cartwright | 111/101 |
| 3,986,562 | 10/1976 | Killion | 172/22 |
| 4,384,537 | 5/1983 | du Brucq | 111/102 |
| 4,569,400 | 2/1986 | Minagawa | 172/21 |
| 4,614,239 | 9/1986 | Minagawa | 172/21 |
| 4,616,578 | 10/1986 | Talbott | 111/110 |

FOREIGN PATENT DOCUMENTS

| | | |
|---|---|---|
| 2531478 | 7/1975 | Fed. Rep. of Germany . |
| 2638846 | 3/1977 | Fed. Rep. of Germany ...... 111/115 |
| 3004900 | 2/1980 | Fed. Rep. of Germany . |
| 356300 | 9/1961 | Switzerland ........................ 111/118 |

Primary Examiner—Danton D. DeMille
Attorney, Agent, or Firm—Ward Brown; Robert W. Beach

[57] ABSTRACT

In a planting device for attaching to an agricultural vehicle a planting slide is mounted on a frame for reciprocating sliding motion horizontally in the direction of travel of the vehicle under the influence of a hydraulically operable pressure cylinder. A support plate is mounted on the slide for sliding adjustment vertically, upwards and downwards, and a hollow, funnel-shaped planting spade is pivotally mounted on the support plate on an axis which extends transversely to the direction of travel of the vehicle.

The tip of the spade is held in a forwardly directed pivoted rest position by means of a pre-stressed spring, but upon rearward pivotting of the spade, as occurs in operation when the support plate slides down so that the spade penetrates the ground, a control valve having a stem articulated to the spade activates the pressure cylinder to push the slide rearwards on the slide. The spade thus remains steady in the same position, despite forward movement of the vehicle, so a plant can reliably be embedded via the spade, without formation of a furrow possible causing its later dislodgement.

14 Claims, 4 Drawing Sheets

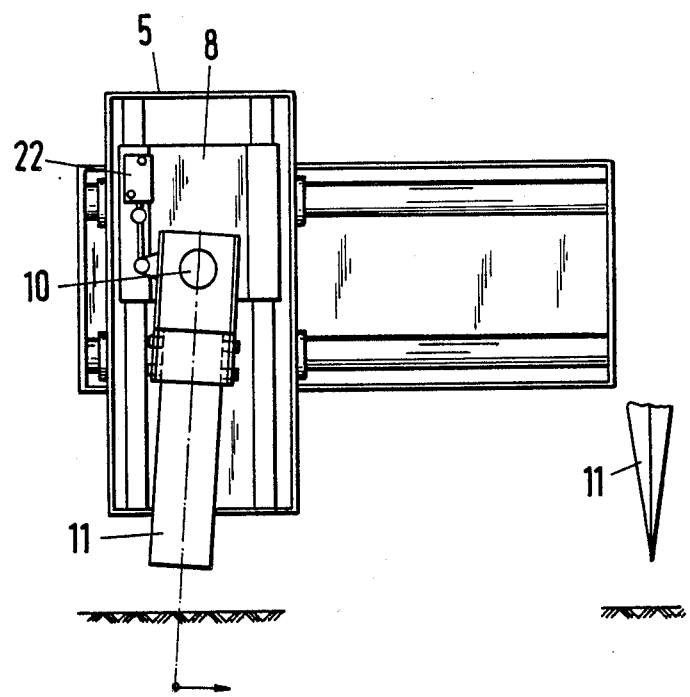
Fig. 3a
Fig. 3b
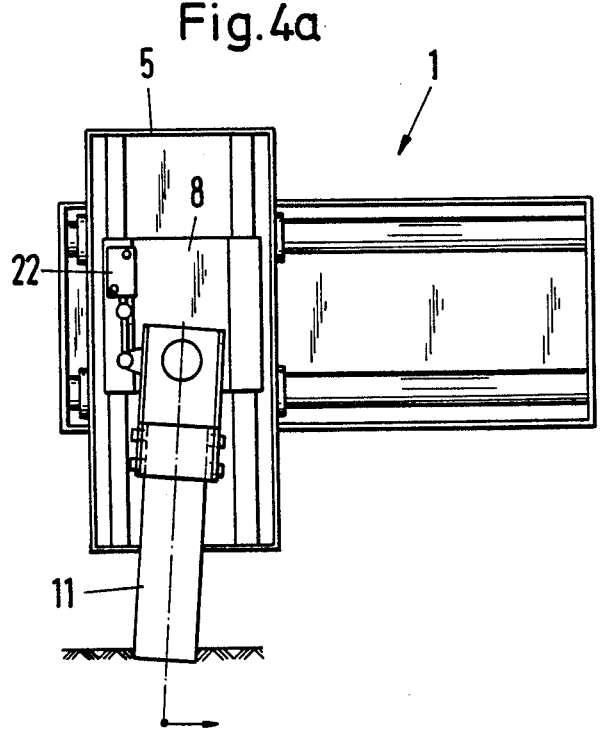
Fig. 4a
Fig. 4b

PLANTING DEVICE ATTACHABLE TO AN AGRICULTURAL VEHICLE

TECHNICAL FIELD

The invention relates to a planting device, more especially for planting vines, which is attachable to an agricultural vehicle, such as a tractor, and which has a funnel-shaped, hollow planting spade provided with an opening device.

BACKGROUND ART

In a conventional vine planting device, three planting spades, each having the shape of a hollow funnel and associated with an opening device, are arranged on the periphery of a wheel which is rotatable about a horizontal axis and is arranged on an agricultural tractor. Due to the relative motion occurring between the planting spades and the soil as the wheel rotates, only a very short time is available for the actual implanting, and often that cannot be satisfactorily achieved. Moreover, an elongate furrow is often created so the plant is not adequately secured.

A planting device wherein a hollow, funnel-shaped spade is arranged in a planting slide in such a manner to be slidable vertically upwards and downwards therein, and the planting slide is mounted on the planting device for reciprocating sliding motion horizontally in the direction of travel of the tractor vehicle by means of a hydraulically operable horizontal pressure cylinder is disclosed in German Patent Specification DE-OS No. 30 04 900. In this known planting device, the planting spade is driven downwards into the soil. By this driving of the planting spade into the soil, the planting spade is blocked in position and, since the tractor vehicle continues its travel, the planting slide glides rearwards on the associated guide means. After withdrawal of the planting spade from the soil, the planting slide is pushed back again into its forward rest position by the pressure-cylinder provided. In this connection, it was found to be a disadvantage that—especially in loose soil—during insertion into and withdrawal from the soil the planting spade still executes a movement relative to the soil as viewed in the direction of travel, so that a furrow is formed in front of and after the planting location. In addition, practical experience has shown, that the necessary easy slidability of the planting slide in horizontal direction cannot be ensured owing to the rough operational conditions, and this inevitably leads to furrow formation which impairs the safe growth of the young plants, since there is considerable risk of their dislodgement, or of lack of adequate contact with the soil from which they derive their nutrients.

Quite separately, German Patent Specification DE-OS No. 25 31 478 discloses a planting machine having a planting tube which is pivotably mounted about a horizontal axis at the end of a jib which is itself pivotably attached to the rear end of a vehicle. The planting tube is held by a prestressed spring in an oblique forwardly inclined position (relative to the direction of travel). In this known machine, for the planting operation the jib is pivoted downwards, so that the planting tube penetrates into the soil and owing to the continuing travel of the planting machine is deflected rearwards against the force of the prestressed spring. It is similarly found with this known device that on inserting and on withdrawing the planting tube from the soil, movement of same relative to the soil occurs as viewed in the direction of travel, so that a furrow is formed in front of and behind the planting spot.

OBJECT OF THE INVENTION

The object of the invention is to provide an improved planting device whereby plants may be set rapidly and securely deep into the soil specifically where furrows do not remain immediately adjacent to the planting location.

SUMMARY OF THE INVENTION

In accordance with the present invention the planting spade is arranged in a planting slide in such a manner as to be slidable vertically upwards and downwards therein, yet is also pivotably mounted about a horizontal axis extending transversely to the direction of travel of the tractor vehicle, and by connection of the planting spade with a prestressed spring it is held with its point in a forwardly-pivoted rest position. Furthermore, the planting slide is itself horizontally reciprocable in the direction of travel by means of a hydraulically operable pressure cylinder, and a control valve for operation of that pressure cylinder is arranged in the planting slide, said valve having a valve stem which is so articulated to the planting spade, that when the latter is deflected away from its obliquely forwardly-directed rest position, against the action of the prestressed spring, the cylinder is automatically actuated to push the planting slide rearwards.

Advantageously, the control valve of the pressure cylinder is so designed, that the sliding velocity of the planting slide is proportional to the deflection of the planting spade.

Preferably, a relief valve is provided, which is actuated by the planting slide in the rest position of the latter.

In a preferred embodiment of the invention, the planting slide is mounted on two parallel-spaced bars so as to be slidable to and fro. The planting spade is preferably mounted on a support plate, which is slidable upwards and downwards in the planting slide.

The planting spade preferably comprises two spade segments, each of which is mounted pivotably about a horizontal axis of rotation at its upper end, the two axes of rotation extending parallel at a distance from each other. The axes of rotation of the spade segments preferably extend in the direction of travel of the tractor vehicle.

The planting spade segments are advantageously connected to a common opening device arranged on the support plate. The opening device preferably comprises a hydraulically operated pressure cylinder, the piston rod of which is hingedly connected by toggle joints with the planting spade segments of the planting spade. The pressure cylinder of the opening device is advantageously operatively connected to a solenoid control valve, such that the planting spade is automatically opened in its lowermost position and remains open until it returns to its upper rest position.

Advantageously, a hydraulically operated vertical pressure cylinder is mounted on the planting slide and has its piston rod connected to the support plate. The vertical pressure cylinder is preferably operatively connected to a further solenoid control valve such that, following a triggering pulse, the planting spade travels automatically downwards and then back again into its upper rest position.

Preferably, a length-measuring device is provided for generating the triggering pulse.

Advantageously, a support beam is provided on the planting device for attachment of soil-tilling implements.

In an advantageous form of embodiment, the planting spade may have associated therewith, an irrigation device and/or a fertilizer-dispensing device.

BRIEF DESCRIPTION OF THE DRAWINGS

The invention is illustrated by way of example in the drawings, in which:

FIGS. 3a to 8b illustrate the planting slide in various working positions in side elevation and the planting spade in the corresponding positions in front elevation.

DETAILED DESCRIPTION OF ILLUSTRATED EMBODIMENT

Figure 2:
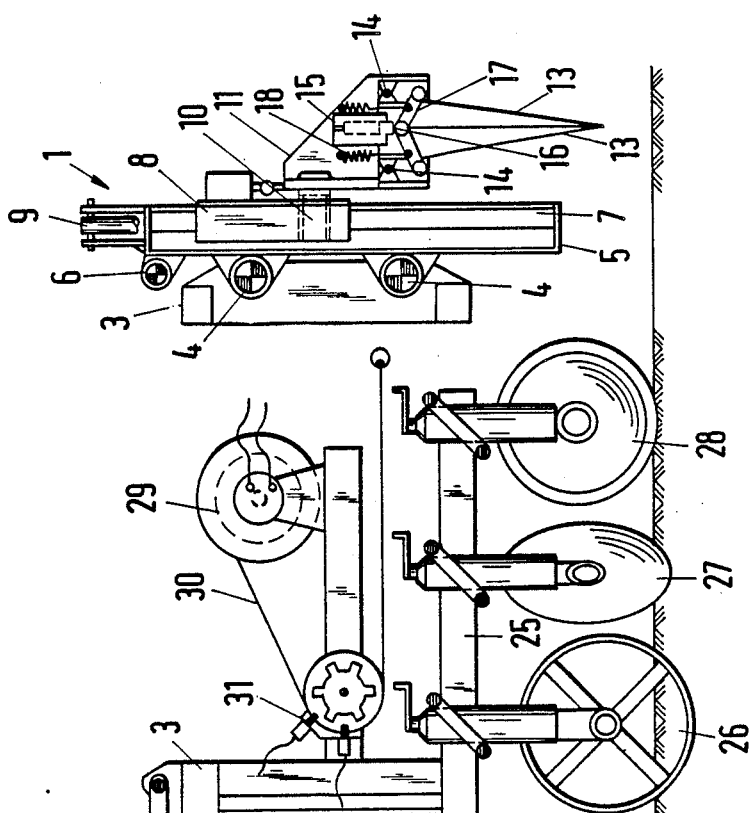
FIG. 2 shows the same planting device in front elevation in its rest position.
Figure 1:
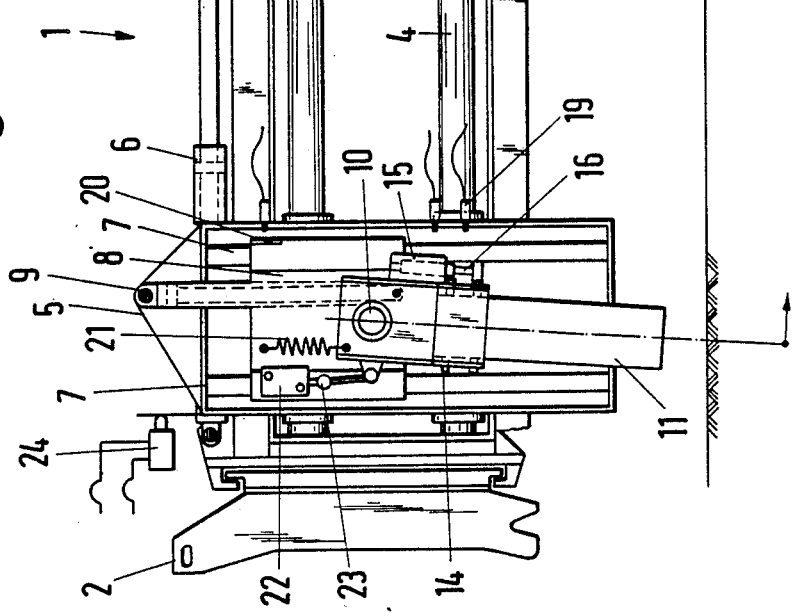
FIG. 1 shows a preferred embodiment of the planting device of the invention in side elevation, in its rest position.

FIGS. 1 and 2 depict a practical embodiment of a planting device 1 in accordance with the present invention, which device can be connected by means of a three-point suspension to an agricultural tractor or other vehicle (not shown). The planting device 1 comprises a support frame 3 in which two parallel bars 4 are arranged, extending horizontally in the direction of travel of the vehicle. A planting slide 5 is mounted on the bars 4 and is slidable to and fro therealong by means of a horizontal hydraulic pressure cylinder 6.

The planting slide 5 includes parallel vertically extending struts 7, on which a support plate 8 is guided in vertical direction to be slidable upwards and downwards by means of a vertical pressure cylinder 9. The support plate 8 has a pivot axis 10 extending horizontally and transversely to the direction of travel of the tractor vehicle, on which axis a planting spade 11 incorporating two spade segments (FIG. 2) is pivotably mounted.

As FIG. 2 shows, the two spade segments 13 are each pivotably mounted at their upper ends about respective rotational axes 14 which extends horizontally and parallel to the direction of travel, the two rotational axes 14 being spaced apart from each other. The planting spade 11 also includes an opening device constituted by a pressure cylinder 15, the piston rod 16 of which is hingedly connected through toggle linkages 17 with the respective planting spade segments 13. Prestressed springs 18 acting between the spade frame and the toggle linkages 17 keep the planting spade segments 13 closed in their rest position.

A solenoid control valve 19 is actuated by a stop 20 arranged on the support plate 8 when said plate 8 is in its lowermost position to bring about operation of the pressure-cylinder 15 so that the spade segments 13 of the planting spade 11 are caused to open.

As FIG. 1 further shows, the planting spade 11 is held be a prestressed spring 21 connected to the support plate 8 in a pivoted rest position, with its tip pointing slightly forwards in the direction of travel. The pivot angle is approximately 4° relative to the vertical.

A control valve 22 which is operatively connected to the horizontal pressure cylinder 6 is mounted on the support plate 8 and this valve 22 has a valve stem 23 which is hingedly connected with the planting spade 11.

In the rest position of the planting slide 5 and of the planting spade 11 shown in FIGS. 1 and 2, the operative condition of the control valve 22 is such that the horizontal pressure cylinder 6 holds the planting slide 5 in its forward position. In fact, a relief valve 24, which is mounted on the support frame 3 of the planting device 1, is actuated by the planting slide 5 when in this rest position so that the horizontal pressure cylinder 6 is relieved.

As FIG. 1 shows, the planting device 1 has, as part of the support frame 3, a rearward-projecting support beam 25, on which further soil-tilling implements 26, 27, 28 are mounted for pressing-in the plants, for heaping-up the soil etc.

The planting device 1 also includes a length-measuring device 29 comprising a measuring wire 30 which is paid out from a reel and passes around a pulley, rotation of which is scanned by means of sensors 31. The sensors 31 control a further solenoid valve (not shown) which operates the vertical pressure cylinder 9.

When operating the planting device 1 according to the invention, the end of the measuring wire 30 is made fast at the starting point of where a row of plants is to be set. The planting slide 5 and the planting spade 11 are situated in their respective rest positions shown in FIG. 3a, namely at the front end of the frame 3, and with the spade tip inclined towards the front, and the operator places a plant to be planted into the funnel-shaped planting spade 11. As FIG. 3b shows, the planting spade 11 is closed at this stage. As soon as the sensors 31 supply a triggering pulse, the vertical pressure cylinder 9 is activated and it pushes the support plate 8 downwards until the planting spade 11 penetrates into the soil, as shown in FIGS. 4a and 4b.

Figure 5A:
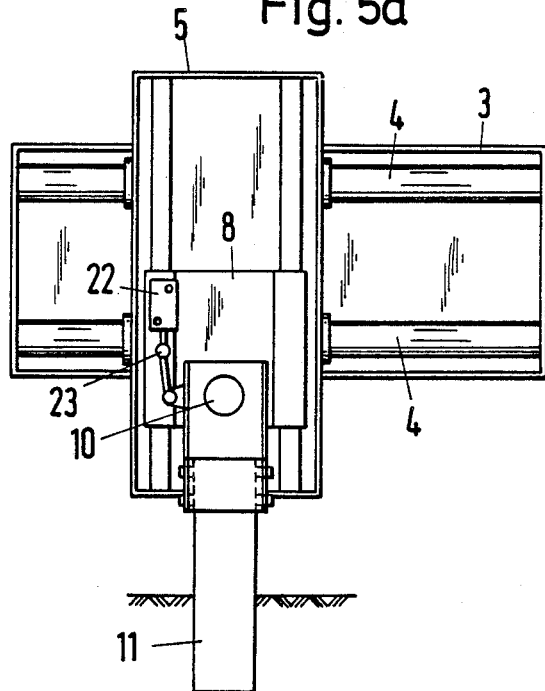
Figure 5B:
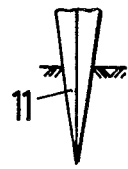

By penetrating into the soil, the planting spade 11 is held fast, so that, as the vehicle on which the device 1 is mounted continues to travel, the spade is caused to pivot rearwards about its pivot axis 10, as shown in FIG. 5a. This actuates the valve stem 23 of the control valve 22 so that the horizontal pressure cylinder 6 is activated, to push the slide 5 rearwards along the bars 4 as shown in FIG. 5a. The control valve 22 provides for a slide velocity proportional to the deflection of the planting spade 11, so that the spade 11 travels rearwards relative to the device 1 at the speed of travel of the conveying tractor vehicle and thus remains at the same spot in the ground.

Figure 6A:
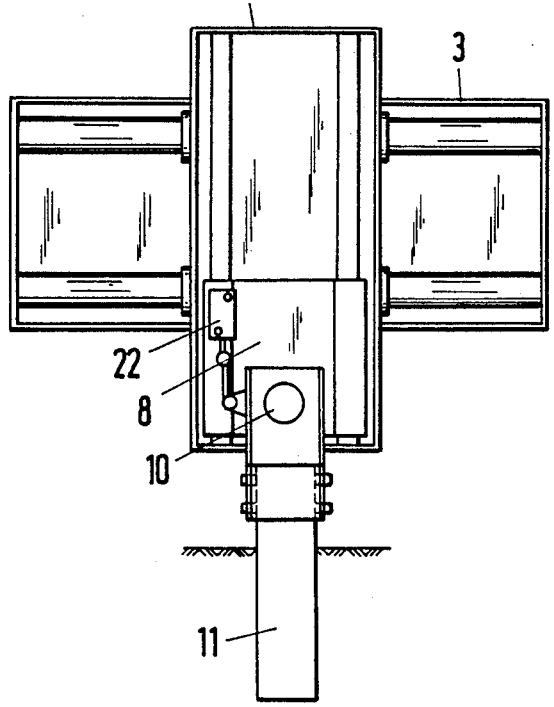
Figure 6B:
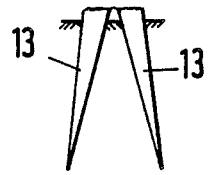
Figure 7A:
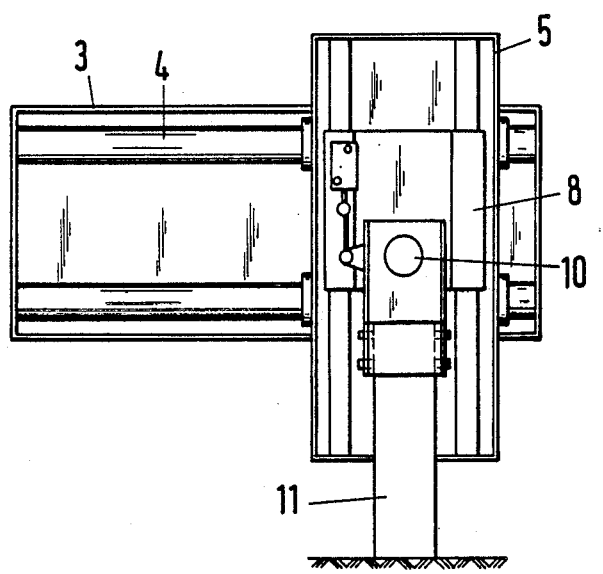
Figure 7B:
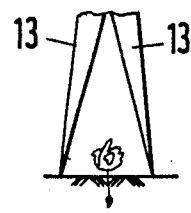
Figure 8A:
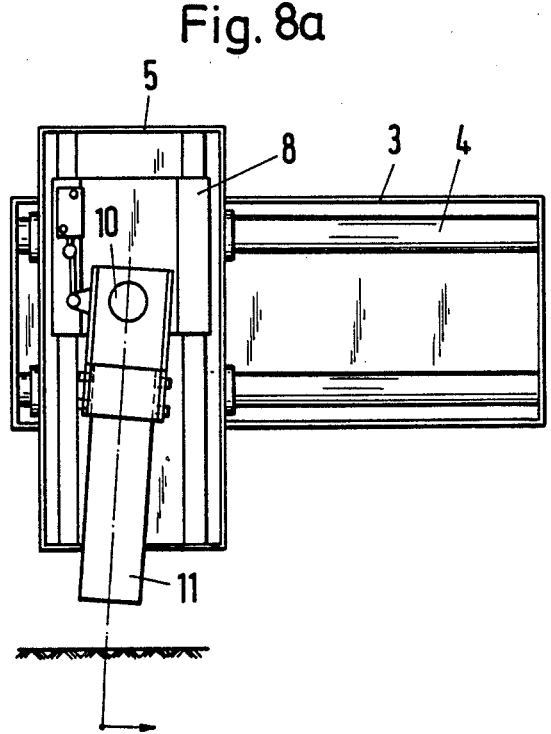
Figure 8B:

Once the support plate 8, and therewith the planting spade 11, has reached its lowermost position on the slide 5, the stop 20 activates the solenoid control valve 19 of the pressure-cylinder 15 so that the planting spade 11 opens, as illustrated in FIGS. 6a and 6b. At the same time, the direction of stroke of the vertical pressure cylinder 9 is reversed so that the planting spade 11 is withdrawn from the soil and closes, as shown in FIGS. 7a and 7b. As long as the planting spade 11 stays in the soil, the horizontal pressure-cylinder 6 remains active, so that the planting slide 5 continues to travel rearwards, as shown in FIG. 7a. When the planting spade 11 loses contact with the soil, as shown in FIG. 8a, the planting spade 11 pivots about its pivot axis 10 under the influence of the spring 21, back to its forward rest position, so that the horizontal pressure-cylinder 6 is reversed and now pushes the planting slide 5 back into its forward rest position until the relief valve 24 is actuated. The planting spade 11 remains open until it has left the region of the planted plant. It then closes. The planting device is then ready for the next planting operation.

An irrigation device and/or a fertilizer-dispensing device may be associated with the planting spade 11 and operate to introduce water or fertilizer, respectively the soil together with the plant itself, in the open position of the planting spade.

I claim:

1. A planting device for attaching to an agricultural vehicle, said device comprising:
   a frame;
   a planting slide mounted on said frame for reciprocating sliding motion horizontally in the direction of travel of the vehicle;
   a hydraulically operable pressure cylinder mounted between said frame and said slide for effecting the aforesaid horizontal sliding motion of said slide relative to said frame;
   support means mounted on said slide for sliding adjustment vertically, upwards and downwards, relative thereto;
   a pivot axis mounted on said support means and extending transversely to the direction of travel of the vehicle;
   a planting spade of hollow form, shaped in the manner of a funnel and having a downwardly directed tip, said spade being pivotally mounted on said pivot axis;
   a prestressed spring connected between said support means and said planting spade to hold said spade with its tip pointing in a forwardly directed pivoted rest position;
   a control valve mounted on said planting slide and operatively connected to said pressure cylinder, said valve having a valve stem articulated to said planting spade so that with said spade in its aforesaid rest position said slide is pushed forward in the direction of travel by said pressure cylinder, yet upon rearward deflection of said planting spade, when said support means has moved downwards to enable it to penetrate the ground, said control valve actuates said pressure cylinder to push said planting slide rearwards relative to said frame.

2. A planting device as set forth in claim 1 wherein said control valve of said horizontal pressure cylinder is so designed that the sliding velocity of said planting slide is proportional to the deflection of said planting spade.

3. A planting device as set forth in claim 1 further including a relief valve for said pressure cylinder, said relief valve being actuated by said planting slide when the latter is in its forward position.

4. A planting device as set forth in claim 1 wherein said frame includes spaced parallel bars and said planting slide is slidable to and fro said bars.

5. A planting device as set forth in claim 1 wherein said support means for mounting said planting spade is in the form of a support plate and wherein said planting slide has vertically arranged parallel struts on which said support plate is slidable upwards and downwards.

6. A planting device as set forth in claim 1 wherein said planting spade has two spade segments each of which is mounted so as to be pivotable about a horizontal pivot axis at its upper ends, the two pivot axes being spaced parallel to each other.

7. A planting device as set forth in claim 6 wherein said pivot axes are arranged to extend in the direction of travel of the vehicle.

8. A planting device as set forth in claim 6 further including a common opening device for said planting spade segments, said opening device being mounted on said support means and connected to said segments.

9. A planting device as set forth in claim 8 wherein said opening device comprises a hydraulically operable pressure cylinder having a piston rod hingedly connected by means of toggle joints with said planting spade segments.

10. A planting device as set forth in claim 9 further including a solenoid control valve connected to said pressure cylinder of said opening device, said valve being actuable to open said planting spade in the lowermost position of said spade and to keep said spade open until it returns into its upper rest position.

11. A planting device as set forth in claim 1 further including a hydraulically operable vertical pressure cylinder mounted on said planting slide, and having a piston rod connected with said support means thereby to move said support means up and down relative to said slide.

12. A planting device as set forth in claim 11 including a further solenoid control valve linked to the vertical pressure cylinder in such a manner that following a triggering pulse the planting spade automatically travels downward relative to the slide and back again into its upper rest position.

13. A planting device as set forth in claim 12 wherein a length-measuring device is provided for generating the triggering pulse.

14. A planting device as set forth in claim 1 further including a supporting beam attached to said frame for mounting soil-tilling implements.

* * * * *